United States Patent
Shoji et al.

(10) Patent No.: US 7,990,570 B2
(45) Date of Patent: Aug. 2, 2011

(54) MULTIPLE FUNCTION PERIPHERAL APPARATUS

(75) Inventors: Fumio Shoji, Kanagawa-ken (JP); Takao Ikuno, Kanagawa-ken (JP); Masahiro Odaira, Kanagawa-ken (JP); Yoshiaki Katahira, Kanagawa-ken (JP); Toru Fujino, Saitama-ken (JP); Kenji Kasuya, Kanagawa-ken (JP); Noritsugu Okayama, Kanagawa-ken (JP); Yashuhito Niikura, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1163 days.

(21) Appl. No.: 11/083,005

(22) Filed: Mar. 18, 2005

(65) Prior Publication Data

US 2005/0206973 A1 Sep. 22, 2005

(30) Foreign Application Priority Data

Mar. 18, 2004 (JP) ................................. 2004-078332

(51) Int. Cl.
*G06F 15/00* (2006.01)

(52) U.S. Cl. ....................... 358/1.6; 358/468

(58) Field of Classification Search ........ 358/1.11–1.18; 399/82

See application file for complete search history.

(56) References Cited

U.S. PATENT DOCUMENTS

| 6,061,470 A | * | 5/2000 | Kiyohara ................ 382/164 |
| 6,975,819 B2 | * | 12/2005 | Katamoto ................ 399/82 |
| 2001/0038469 A1 | | 11/2001 | Saito |
| 2004/0240642 A1 | * | 12/2004 | Crandell et al. ........ 379/88.22 |
| 2005/0017075 A1 | * | 1/2005 | Chou et al. .............. 235/454 |
| 2005/0052687 A1 | * | 3/2005 | Hirakawa ................ 358/1.15 |

FOREIGN PATENT DOCUMENTS

| CN | 1327341 A | 12/2001 |
| JP | 06-038053 | 2/1994 |
| JP | 2002-209052 | 7/2002 |
| JP | 2002-247388 | 8/2002 |

* cited by examiner

*Primary Examiner* — Twyler L Haskins
*Assistant Examiner* — Lennin Rodriguez
(74) *Attorney, Agent, or Firm* — Fitzpatrick, Cella, Harper & Scinto

(57) ABSTRACT

There is provided a user-friendly multiple function peripheral apparatus which eliminates a wasteful data process in the apparatus even when a color scan start key is pressed. This invention provides a multiple function peripheral apparatus including a scanner unit having monochrome and color scanner functions, a facsimile transmission unit having only a monochrome facsimile transmission function, a color scan start key which instructs the scanner unit to execute color scan, a monochrome scan start key which instructs the scanner unit to execute monochrome scan, and a facsimile transmission control unit which controls operation of the facsimile transmission unit on the basis of a condition of correspondence set in advance between the color scan start key and the monochrome facsimile function when facsimile transmission is instructed with the color scan start key.

2 Claims, 7 Drawing Sheets

MULTIPLE FUNCTION PERIPHERAL APPARATUS

FIELD OF THE INVENTION

The present invention relates to a multiple function peripheral (to be referred to as MFP) apparatus capable of executing a plurality of jobs such as a scan job, print job, and facsimile job by a single apparatus and, more particularly, to the software control configuration of the MFP apparatus.

BACKGROUND OF THE INVENTION

Some conventional multiple function peripheral (MFP) apparatuses having a color scanner function and facsimile transmission function have both a color scan start key which instructs execution of color scan and a monochrome scan start key which instructs execution of monochrome scan. Some of such conventional MFP apparatuses are equipped with only a monochrome facsimile transmission function without any color facsimile transmission function.

When an MFP apparatus of this type is instructed on facsimile transmission with a color scan start key, the apparatus temporarily executes color scan, performs a process of converting color data into monochrome data, and then executes facsimile transmission.

Upon pressing the color scan start key, the conventional MFP apparatus scans an original as color data though this MFP apparatus does not originally have any color facsimile transmission function, and then converts the color data into monochrome data. This roundabout process is wasteful in the data process in the apparatus, and the time till execution of facsimile transmission becomes longer.

SUMMARY OF THE INVENTION

The present invention has been made to overcome the conventional drawbacks, and provides a user-friendly MFP apparatus which eliminates a wasteful data process in the apparatus even when a color scan start key is pressed.

According to a preferred aspect of the present invention, the foregoing object is attained by providing a multiple function peripheral apparatus comprising: a scanner unit having monochrome and color scanner functions; a facsimile transmission unit having only a monochrome facsimile transmission function; a color scan start key which instructs the scanner unit to execute color scan; a monochrome scan start key which instructs the scanner unit to execute monochrome scan; and a facsimile transmission control unit which controls operation of the facsimile transmission unit on the basis of a condition of correspondence set in advance between the color scan start key and the monochrome facsimile function when facsimile transmission is instructed with the color scan start key.

Other features and advantages of the present invention will be apparent from the following descriptions taken in conjunction with the accompanying drawings, in which like reference characters instruct the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DETAILED DESCRIPTION OF THE PREFERRED EMBODIMENTS

Preferred embodiments of the present invention will be described below with reference to the accompanying drawings.

<Hardware Configuration>

Figure 1:
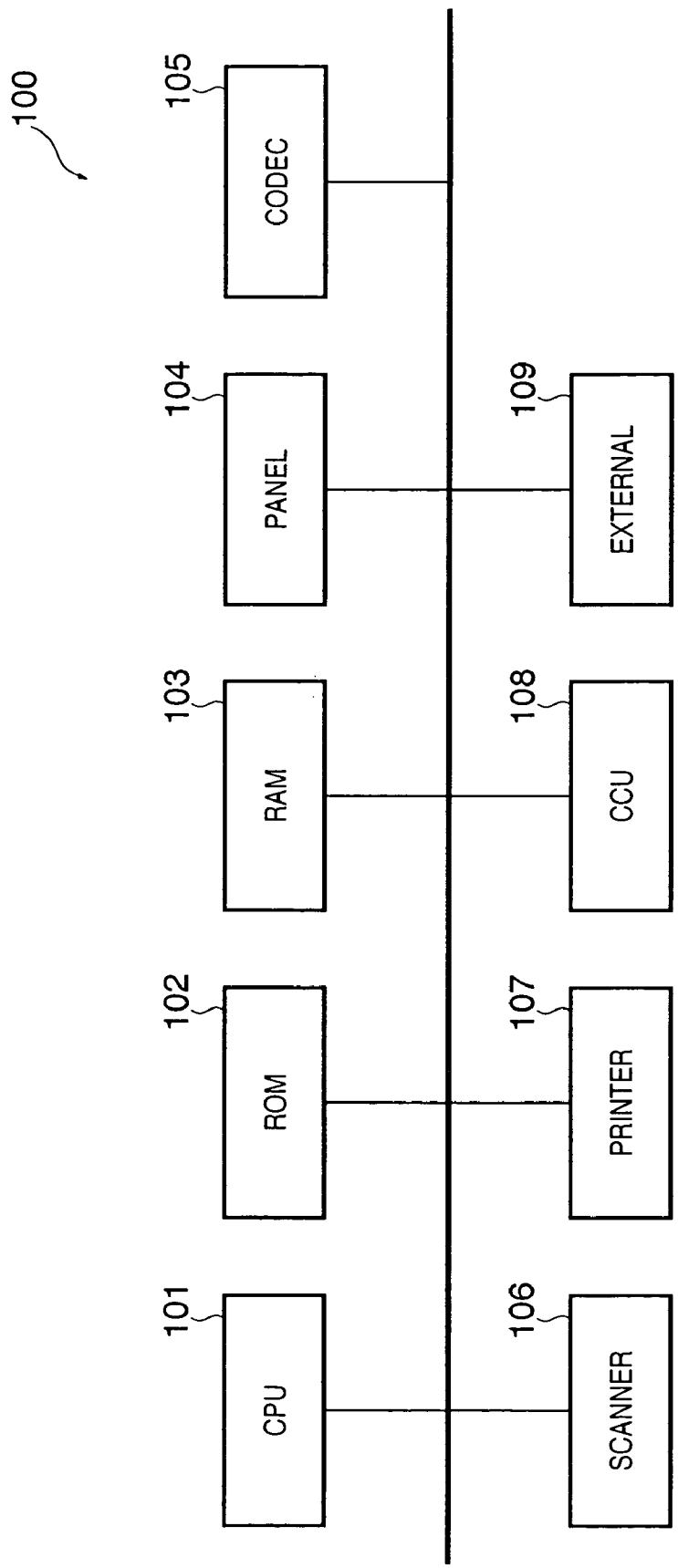
FIG. 1 is a block diagram showing the hardware configuration of an MFP apparatus according to the present invention.

FIG. 1 is a block diagram showing the hardware configuration of an MFP (Multiple Function Peripheral) apparatus 100 common to the embodiments.

In FIG. 1, reference numeral 101 denotes a CPU which reads out various executing programs stored in a ROM 102, executes the programs, and controls the whole apparatus by using a RAM 103.

The ROM 102 is a medium which stores various fixed data in addition to the executing programs, and in some cases, may be a writable medium.

The RAM 103 is a medium which stores temporary data, image data, and the like when the CPU 101 executes a program instruction.

Reference numeral 104 denotes a panel (operation panel) which controls the user interface of the MFP apparatus 100. The panel 104 is an interface including operation buttons and a ten-key pad for allowing the user to input predetermined data and an instruction. Reference numeral 105 denotes a CODEC which codes/decodes data on the basis of various image data coding methods. The CODEC 105 can cope with JPEG, JBIG, TIFF, TEXT, and the like as coding methods.

Figure 2:
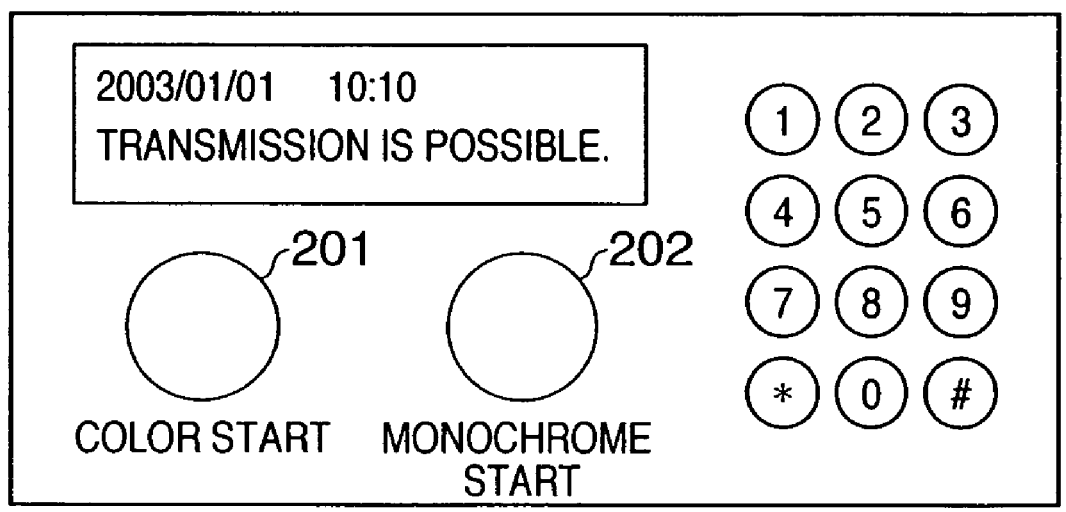
FIG. 2 is a schematic view showing a case in which the operation panel of the MFP apparatus according to the present invention is in a nonoperation mode.

Reference numeral 106 denotes a scanner having a function of optically reading an original and converting the original into image data. The scanner 106 can execute color scan operation and monochrome scan operation. For this purpose, the MFP apparatus 100 has a color scan start key 201 and monochrome scan start key 202, as shown in FIG. 2. Reference numeral 107 denotes a printer having a function of printing image data.

Reference numeral 108 denotes a CCU (Communication Control Unit) which controls a facsimile communication protocol and controls transmission/reception of facsimile data. The MFP apparatus 100 according to the embodiment has only a monochrome facsimile transmission function, and does not have any color facsimile transmission function. Monochrome facsimile transmission also starts in response to pressing the monochrome scan start button 202. A process when the color scan start button 201 is pressed in facsimile transmission is the gist of the present invention, and the operation will be described in detail in the following embodiments.

Facsimile transmission control may be done by communication control by the CPU 101, but is a processing unit arranged for facsimile communication in order to distribute the processing load. In the embodiment, reference numeral 109 denotes an EXTERNAL such as a USB or LAN which controls an external interface and controls transmission/reception of various data.

FIG. 2 is a view showing a state in which the operation panel of the MFP apparatus 100 is in a nonoperation mode (standby mode in which no operation is done). In the nonoperation mode, a message "transmission is possible." is displayed on the panel.

Figure 3:
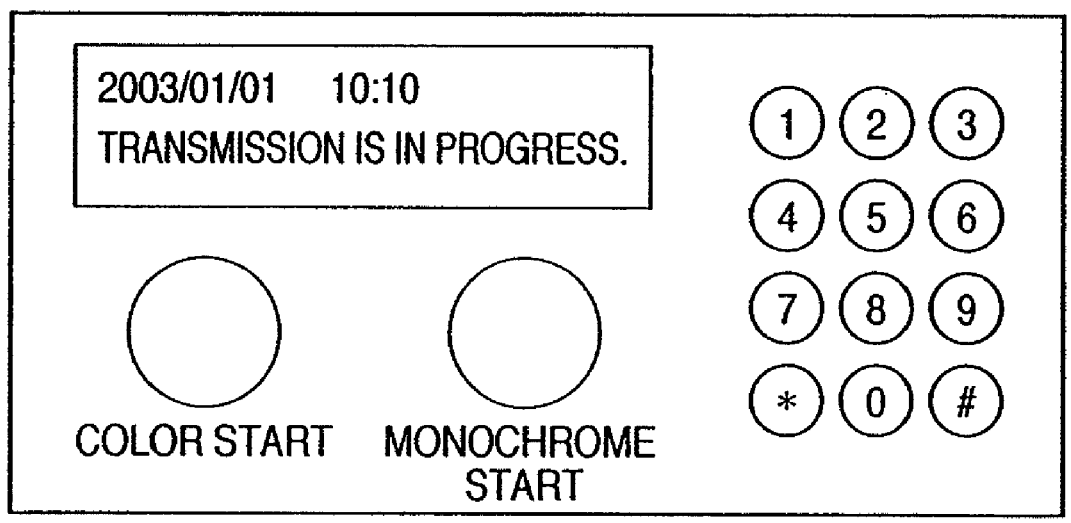
FIG. 3 is a schematic view showing a case in which the operation panel of the MFP apparatus according to the present invention is in a transmission mode.

FIG. 3 is a view showing a state in which the operation panel of the MFP apparatus 100 is in communication. When the MFP apparatus is in FAX communication, a message "transmission is in progress." or "reception is in progress." is displayed on the panel.

First Embodiment

Figure 4:
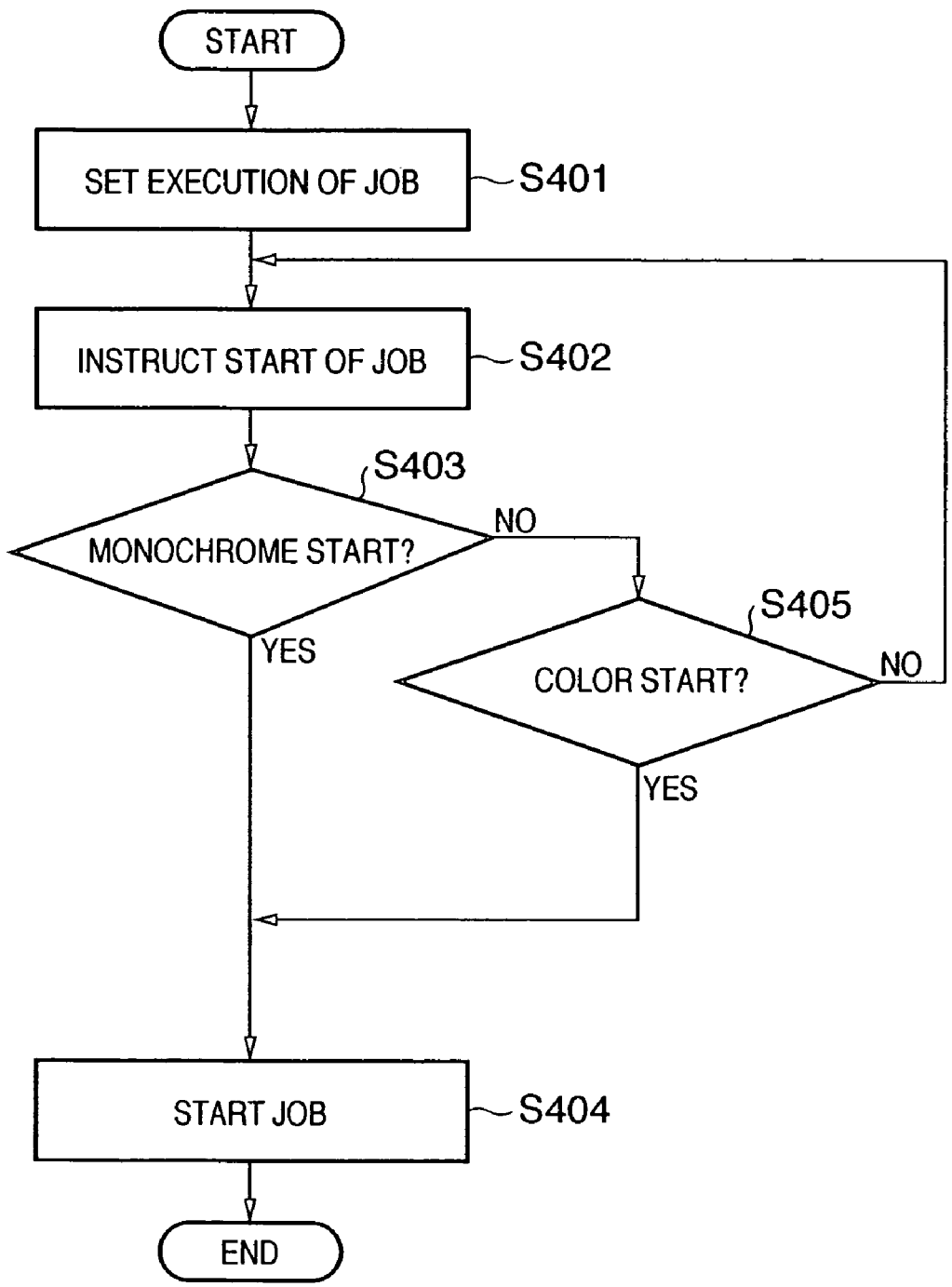
FIG. 4 is a flowchart for explaining processing operation of an MFP apparatus according to the first embodiment of the present invention.

FIG. 4 is a flowchart for explaining operation according to the first embodiment of the present invention.

The first embodiment is related to a process when the color scan start key is pressed at the start of a facsimile transmission job and the color start key is unconditionally valid.

In step S401, setting of the telephone number input of a receiver or the like necessary for a facsimile transmission job is executed. In step S402, the start of the facsimile transmission job is instructed. In general, the start is normally instructed with a monochrome scan start key 202.

In step S403, it is determined whether the start of the facsimile transmission job has been instructed with the monochrome start key 202 in step S402.

If the determination result in step S403 is the monochrome start key, the process moves to step S404 to start the facsimile transmission job. The display of the panel at this time is illustrated in FIG. 3. Upon the completion of facsimile transmission, the process ends normally.

If the determination result in step S403 is not the monochrome start key, the process moves to step S405. In step S405, it is determined whether the pressed button is the color start key.

If the determination result in step S405 is the color start key, the process moves to step S404 to start the facsimile transmission job. The display of the panel at this time is illustrated in FIG. 3. Thus, even if the user erroneously presses a color start key 201 without being aware of it, the process is normally completed. Even if the user is aware of the error, the process can be normally completed without the need for another operation.

If the determination result in step S405 is not the color start key but is, e.g., any key of the ten-key pad, the process returns to step S402 to perform the process from the instruction of the start of the facsimile transmission job. In this case, a message "please input instruction again." may be displayed on the panel.

As described above, according to the first embodiment, even if the color scan start key 201 is pressed, a proper process can be executed. The first embodiment can provide an MFP apparatus very convenient for the user, and can eliminate a wasteful process in the apparatus.

Second Embodiment

Figure 5:
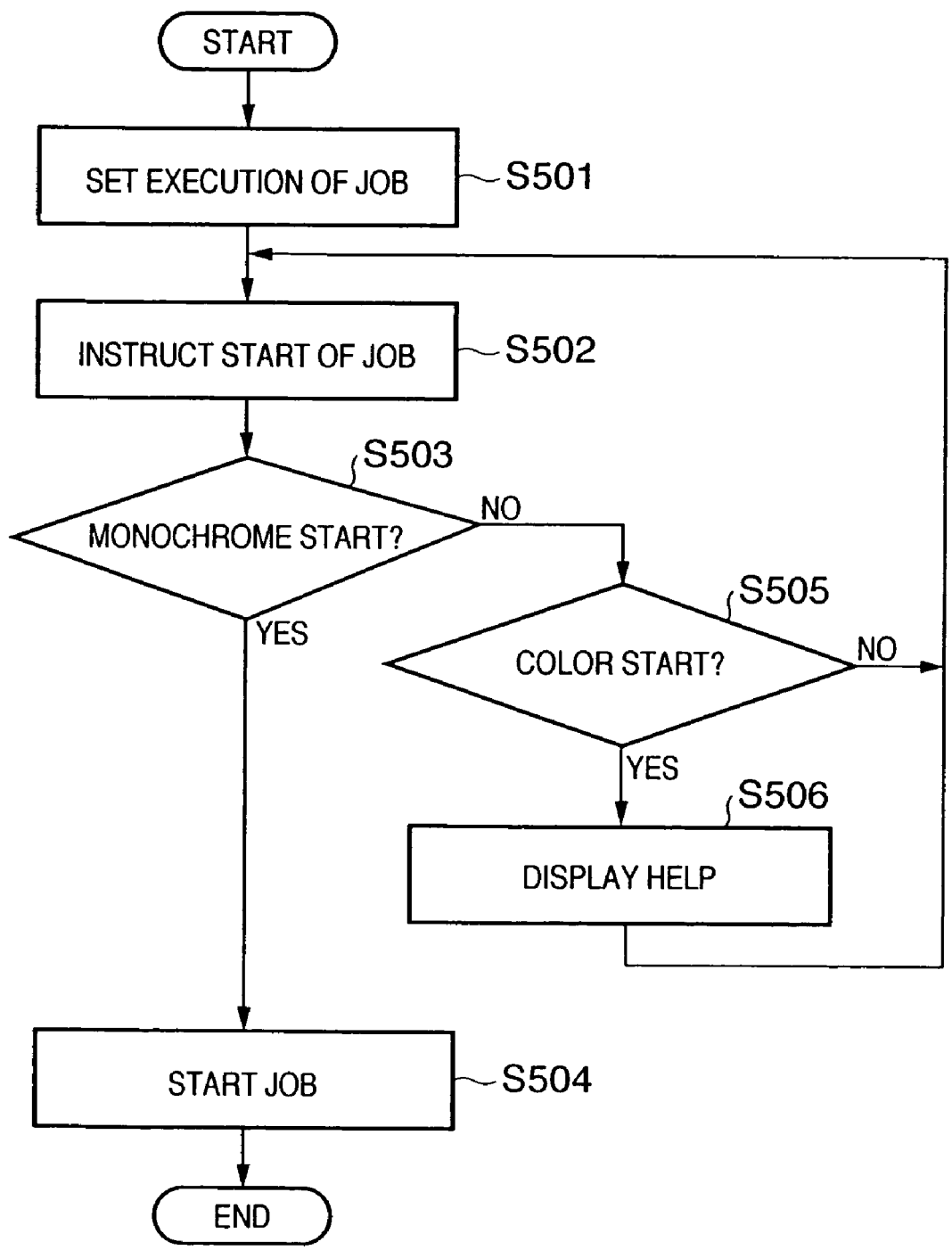
FIG. 5 is a flowchart for explaining processing operation of an MFP apparatus according to the second embodiment of the present invention.

FIG. 5 is a flowchart for explaining operation according to the second embodiment of the present invention.

The second embodiment is related to a process when the color start key is pressed at the start of a facsimile transmission job and the color start key is invalid.

In step S501, setting of the telephone number input of a receiver or the like necessary for a facsimile transmission job is executed. In step S502, the start of the facsimile transmission job is instructed. In general, the start is normally instructed with a monochrome scan start key 202.

In step S503, it is determined whether the start of the facsimile transmission job has been instructed with the monochrome start key 202 in step S502.

If the determination result in step S503 is the monochrome start key, the process moves to step S504 to start the facsimile transmission job. The display of the panel at this time is illustrated in FIG. 3. Upon the completion of facsimile transmission, the process ends normally.

Figure 6:
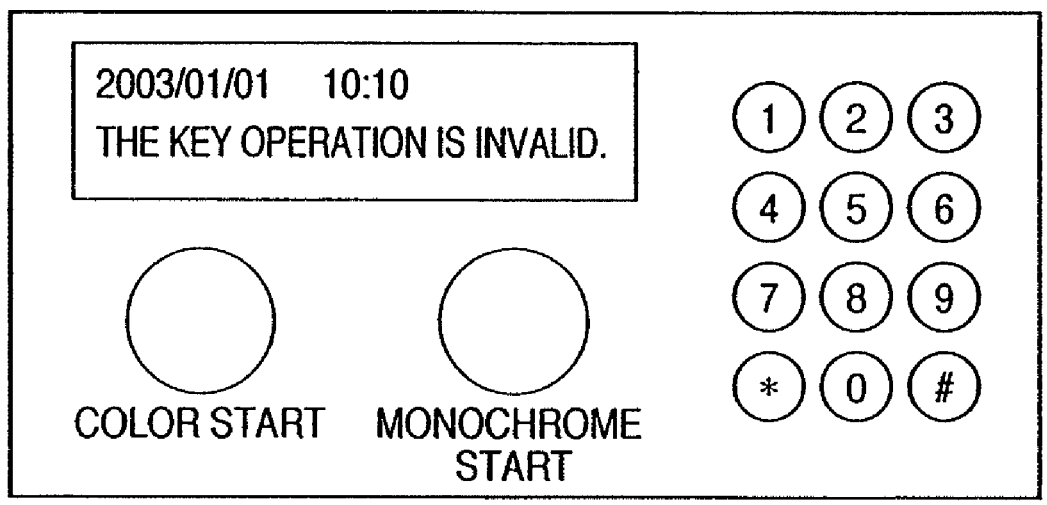
FIG. 6 is a view showing a state in which the operation panel of the MFP apparatus according to the second embodiment displays a help message in response to an invalid operation.

If the determination result in step S503 is not that the monochrome start key has been pressed, the process moves to step S505. If it is determined in step S505 that the color start key has been pressed, the process moves to step S506 to display (display help) a message "the key operation is invalid." on the panel, as shown in FIG. 6. The process then returns to step S502 to perform the process again from the instruction of the start of the facsimile transmission job.

Also, if the determination result in step S505 is not the color start key, the process returns to step S502 to perform the process again from the instruction of the start of the facsimile transmission job.

The help display is not limited to the display "the key operation is invalid.", but may be a display "color data cannot be or is not transmitted."

The second embodiment can prevent a situation in which monochrome transmission is done though the user wants color facsimile transmission, and can provide a user-friendly MFP apparatus which can meet the needs of the user. Further, the second embodiment can eliminate a wasteful process in the MFP apparatus.

Third Embodiment

Figure 7:
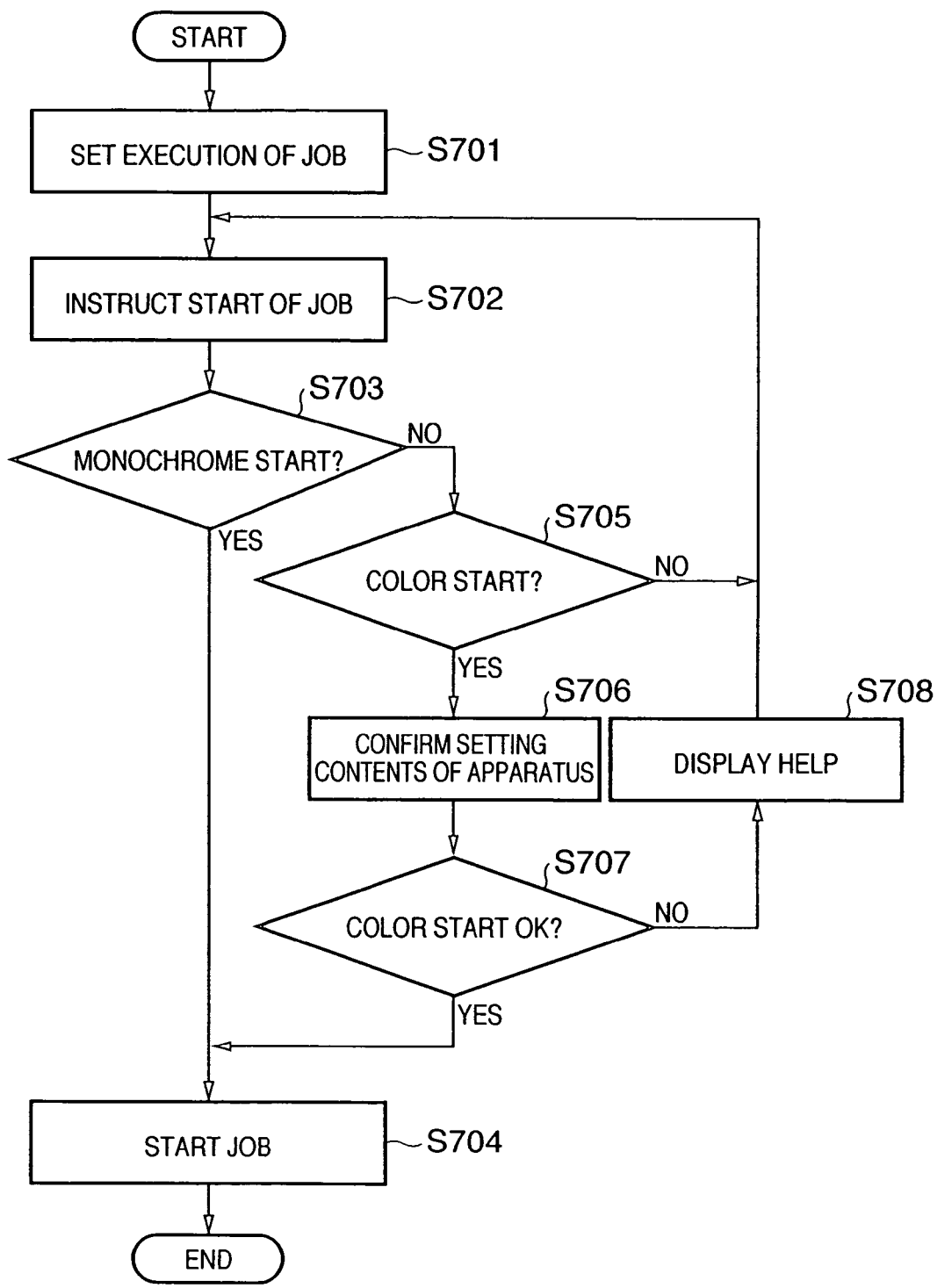
FIG. 7 is a flowchart for explaining processing operation of an MFP apparatus according to the third embodiment of the present invention.

FIG. 7 is a flowchart for explaining operation according to the third embodiment of the present invention.

The third embodiment is related to a process when the color start key is pressed at the start of a facsimile transmission job and the color start key is valid or invalid depending on the apparatus setting.

In step S701, setting of the telephone number input of a receiver or the like necessary for a facsimile transmission job is executed. In step S702, the start of the facsimile transmission job is instructed. In general, the start is normally instructed with a monochrome scan start key 202.

In step S703, it is determined whether the start of the facsimile transmission job has been instructed with the monochrome start key 202 in step S702.

If the determination result in step S703 is that the monochrome start key has been pressed, the process moves to step S704 to start the facsimile transmission job. The display of the panel at this time is illustrated in FIG. 3. Upon the completion of facsimile transmission, the process ends normally.

If the determination result in step S703 is not that the monochrome start key has been pressed, the process moves to step S705 to determine whether a color start key 201 has been pressed. If it is determined in step S705 that the color start key has been pressed, the process moves to step S706 to confirm the setting contents of an MFP apparatus 100. Note that valid/invalid setting of the color start key is achieved by mode selection operation input from an operation panel 104, and information on the selected mode is stored in a RAM 103.

In step S707, it is further determined on the basis of the contents confirmed in step S706 whether pressing the color start key 201 at the start of the facsimile transmission job is valid. If it is determined in step S707 that pressing the color start key 201 is valid, the process moves to step S704 to start the facsimile transmission job. The display of the panel at this time is illustrated in FIG. 3. Upon the completion of facsimile transmission, the process ends normally.

If it is determined in step S707 that pressing the color start key 201 is invalid, the process moves to step S708 to display (display help) a message "the key operation is invalid." The process then returns to step S702 to perform the process again from the instruction of the start of the facsimile transmission job.

If the determination result in step S705 is not that the color start key has been pressed, the process returns to step S702 to perform the process again from the instruction of the start of the facsimile transmission job.

According to the third embodiment, the user can select whether the color start key is valid or invalid, and can select a mode in accordance with the usage style. The third embodiment can provide an MFP apparatus very convenient for the user, and can eliminate a wasteful process in the MFP apparatus.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-078332 filed on Mar. 18, 2004, which is hereby incorporated by reference herein.

What is claimed is:

1. A multiple function peripheral apparatus having an operation panel operable by a user, comprising:
    a scanner unit having a monochrome scanner function and a color scanner function;
    a facsimile transmission unit having a monochrome facsimile transmission function and no color facsimile transmission function;
    a color scan start key on the operation panel to instruct said scanner unit to execute the color scanner function;
    a monochrome scan start key on the operation panel to instruct said scanner unit to execute the monochrome scanner function;
    a mode selection unit on the operation panel to indicate whether monochrome facsimile transmission of a color image is valid or invalid; and
    a facsimile transmission control unit to control operation of said facsimile transmission unit to perform the monochrome facsimile transmission function when said color scan start key is pressed,
    wherein
    if monochrome facsimile transmission is indicated as valid by operation of said mode selection unit, said facsimile transmission control unit permits the operation of said facsimile transmission unit, and
    if monochrome facsimile transmission is indicated as invalid by operation of said mode selection unit, said facsimile transmission control unit inhibits the operation of said facsimile transmission unit,
    thereby controlling the operation regardless of whether a receiver has color reception performance.

2. The apparatus according to claim 1, further comprising a notification unit which notifies that an invalid key operation has been done when the operation of said facsimile transmission unit is inhibited by said facsimile transmission control unit.

* * * * *